US012320324B2

(12) United States Patent
Patil et al.

(10) Patent No.: US 12,320,324 B2
(45) Date of Patent: Jun. 3, 2025

(54) MODULAR HYDROKINETIC TURBINE SYSTEM

(71) Applicant: Southwest Research Institute, San Antonio, TX (US)

(72) Inventors: Abhay Patil, San Antonio, TX (US); Jason Wilkes, Fair Oaks Ranch, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 17/902,934

(22) Filed: Sep. 5, 2022

(65) Prior Publication Data

US 2024/0077055 A1 Mar. 7, 2024

(51) Int. Cl.

| | |
|---|---|
| ***F03B 17/06*** | (2006.01) |
| *F03B 11/00* | (2006.01) |
| *F03B 11/06* | (2006.01) |
| *F03B 13/10* | (2006.01) |
| *F03B 13/26* | (2006.01) |

(52) U.S. Cl.

CPC ............. *F03B 17/061* (2013.01); *F03B 11/00* (2013.01); *F03B 11/06* (2013.01); *F03B 13/10* (2013.01); *F03B 13/26* (2013.01); *F05B 2220/32* (2013.01); *F05B 2230/60* (2013.01); *F05B 2230/61* (2013.01); *F05B 2240/372* (2020.08); *F05B 2240/50* (2013.01); *F05B 2240/54* (2013.01); *F05B 2240/97* (2013.01)

(58) Field of Classification Search

CPC ........ F03B 17/061; F03B 13/10; F03B 13/26; F03B 11/00; F03B 11/06; F05B 2240/97; F05B 2230/60; F05B 2240/372; F05B 2240/50; F05B 2240/54; F05B 2220/32; F05B 2230/604; F05B 2230/608; F05B 2230/61

See application file for complete search history.

(56) References Cited

U.S. PATENT DOCUMENTS 1,563,175 A * 11/1925 Edwards ............... F03B 17/061 416/194
5,946,909 A * 9/1999 Szpur .................... F03B 17/061 416/85
11,549,479 B1 * 1/2023 Yang ..................... F03B 17/061
2010/0045043 A1 * 2/2010 Gostner ................ F03B 17/061 290/52

(Continued)

FOREIGN PATENT DOCUMENTS

FR 2997458 A1 * 5/2014 ............ F03B 13/264

*Primary Examiner* — Christopher Verdier
*Assistant Examiner* — Arthur Paul Golik
(74) *Attorney, Agent, or Firm* — Livingston Law Firm

(57) ABSTRACT

A modular hydrokinetic turbine system for installation in a water stream. The system is assembled from a number of blade modules and a number of support modules, connected in the direction of the water stream. Each blade module has turbine blades, a rotor shaft portion, and two-piece rotor shaft coupling. The support modules rest on the stream bed and support the blade modules. The rotor shaft couplings allow the blade modules to be connected such that the rotor shaft portions provide a rotor shaft, but also allow the blade modules to be separable from the support modules. A generator located at one end of the system is driven by the rotor shaft.

13 Claims, 9 Drawing Sheets

(56) References Cited

U.S. PATENT DOCUMENTS

| | | | | |
|---|---|---|---|---|
| 2012/0133140 | A1* | 5/2012 | Cornelius | F03B 13/264 290/54 |
| 2012/0211988 | A1* | 8/2012 | Harding | F03B 13/183 290/54 |
| 2013/0302169 | A1* | 11/2013 | Hennes | F03D 1/0691 416/170 R |
| 2014/0196446 | A1* | 7/2014 | Holley | F03D 9/255 60/398 |
| 2015/0050152 | A1* | 2/2015 | Ebbesen | F03D 1/0691 416/204 R |

* cited by examiner

MODULAR HYDROKINETIC TURBINE SYSTEM

TECHNICAL FIELD OF THE INVENTION

This patent application relates to hydrokinetic turbines, and more particularly to arrays of hydrokinetic turbines.

BACKGROUND OF THE INVENTION

Hydrokinetic turbines are a type of renewable energy device, designed to gain the energy of flowing water without the need for conventional hydroelectric facilities such as dams. Hydrokinetic turbine systems may be installed in natural streams, such as rivers, ocean currents, tidal estuaries, and also in some human-made waterways and canals. Hydrokinetic turbine systems may also be used in ocean-energy structures, which can extract energy from tidal and marine currents.

The hydrokinetic turbines are designed to be installed underwater, in floating, fixed, anchored, or towed configurations. The turbines drive a rotor connected to a generator. These systems may be in any place where the effective water flow has a sufficient minimum speed to generate energy.

Hydrokinetic turbines can be characterized by their rotational axis orientation relative to the water flow direction. One type is an axial flow turbine, with a horizontal axis, parallel to the water flow. The second type, a cross flow turbine, has either a horizontal axis or a vertical axis, perpendicular to the flow direction.

Most axial-flow hydrokinetic turbines are "lift-based" as opposed to "drag-based". Lift-based, axial-flow turbines generally use the same principles as aircraft wings, propellers, and wind turbines.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a modular hydrokinetic turbine system, having an axial rotor configuration. Multiple blade modules are arranged in series on a single rotor shaft. The modular approach allows for high power per installation, minimal downtime for module swaps due to damage, high economy of scale at low installation volumes, and flexibility in source customization with standardized equipment. Reaction and hydraulic forces acting on the turbine system are low, allowing a design with a minimized support structure. This drives manufacturing costs down.

Figure 1:
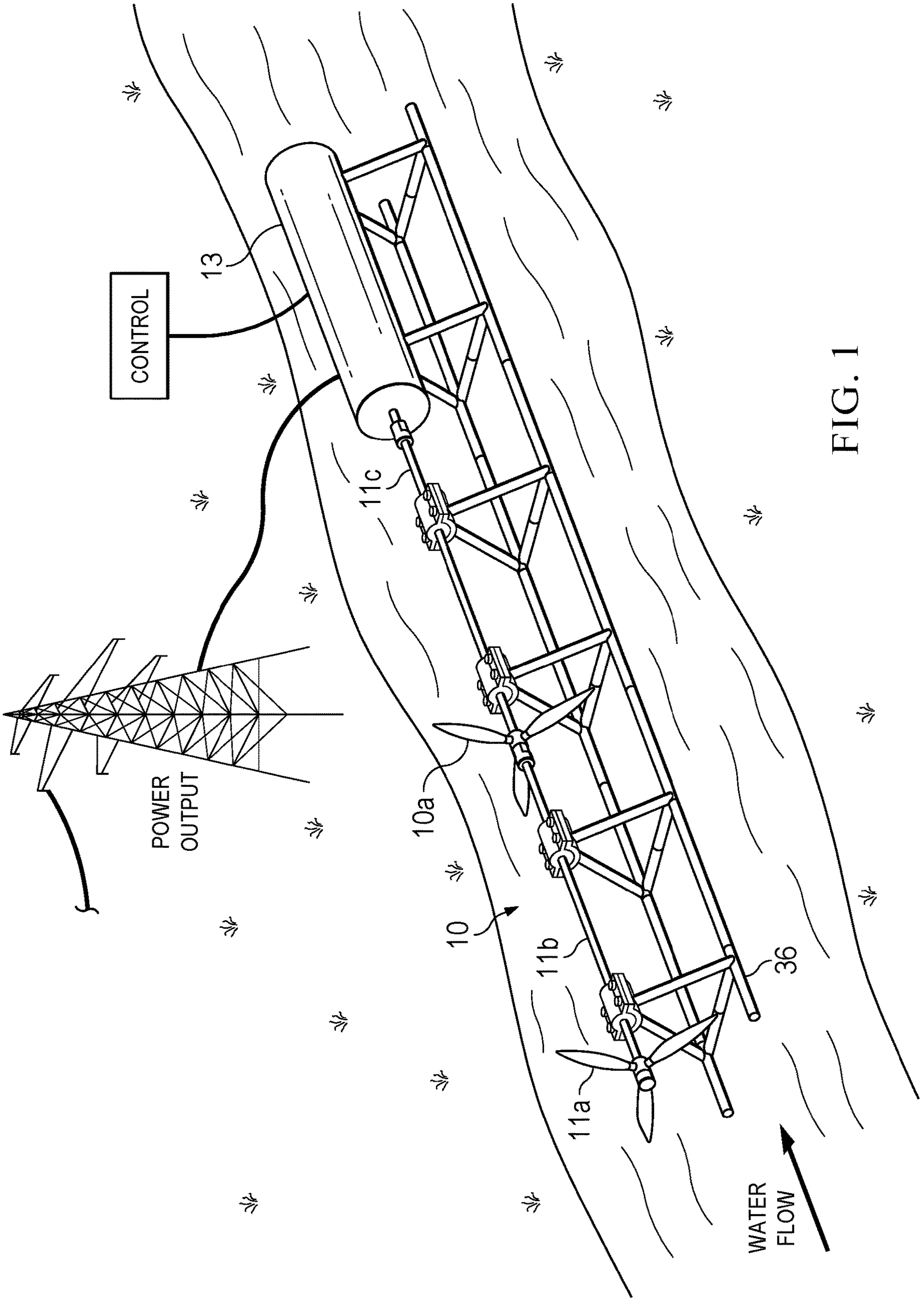
FIG. 1 illustrates the modular hydrokinetic turbine system installed in a water stream.

FIG. 1 illustrates the modular hydrokinetic turbine system 10 installed in a water stream. For purposes of this description, system 10 is described as being installed in a "stream", with this term being used in a general sense to describe any flowing waterway, tidal or riverine.

Modular turbine system 10 is comprised of blade modules 11 and support modules 12. Blade modules 11 are installed atop support modules 12 to result in a series of assembled turbine system modules that run lengthwise down the water stream.

In the example of FIG. 1, modular hydrokinetic turbine system 10 has only two blade modules 11 and two corresponding support modules 12, but the system can be easily scaled larger with additional modules.

Each blade module 11 has a blade set 11*a* and a rotor shaft portion 11*b*. When system 10 is assembled, the rotor shaft portions 11*b* are connected lengthwise to provide a rotor shaft 11*c*, which drives a generator 13 to generate electrical power. The power is delivered to whatever infrastructure is appropriate for the hydrokinetic application.

The blade modules 11 and the generator 13 are supported by the support modules 12, which rest on the bottom of the water stream. System 10 may be installed by first laying support modules 12 onto the stream bed and connecting them together. The blade modules 11 are then attached atop support modules 12. However, there are various installation alternatives such as by first connecting all support modules 12 then laying them onto the stream bed, or by first assembling each blade module 11 to one or more support modules 12 and then connecting those module sets together in the water stream.

As is evident from the description herein, the modular hydrokinetic turbine system 10 mitigates support requirements for both length and width by utilizing the length inherent in the structure, reducing cross-sectional profile. It requires mainly shear at the surface of the stream bed, thereby reducing the force normal.

As illustrated, the water flow presents to the blade set 11*a* of a first blade module 11. Each additional blade set 11*a* faces the water flow. As further described below, the blade modules 11 are spaced apart so that wake losses are minimized and activation of the blades of each module is optimized.

Figure 2:
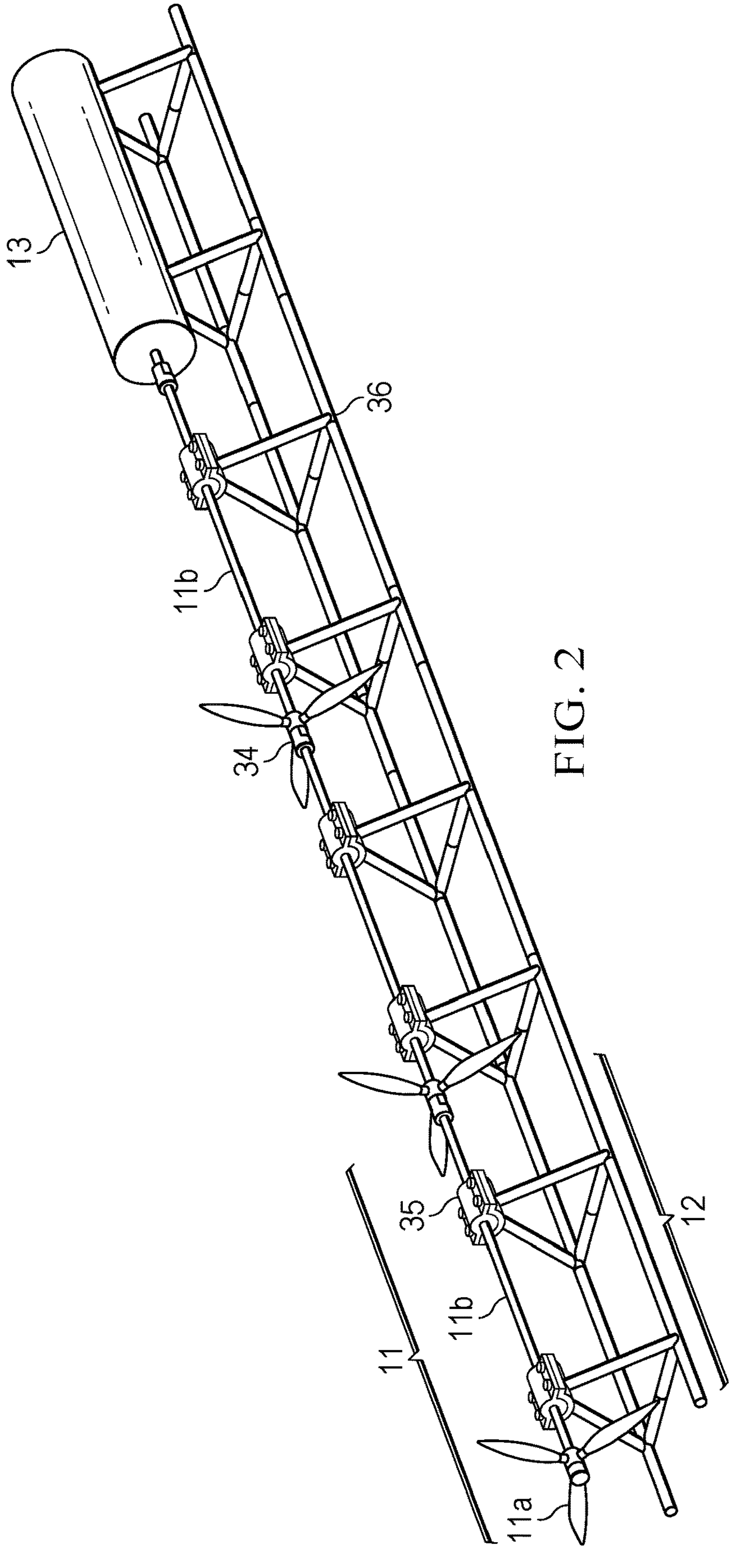
FIG. 2 is a perspective view of the modular hydrokinetic turbine system.

FIG. 2 is a perspective view of the modular hydrokinetic turbine system 10. In the example of FIG. 2, turbine system 10 has three blade modules 11 and a number of support modules 12. The number of blade modules 11 and support modules 12 need not be the same; one or more support modules 12 may be used for a single blade module 11. In other words, the blade modules 11 and support modules 12 can correspond in length so that there is a one-to-one ratio of blade modules 11 to support modules 12, but other configurations are possible.

Figure 3:
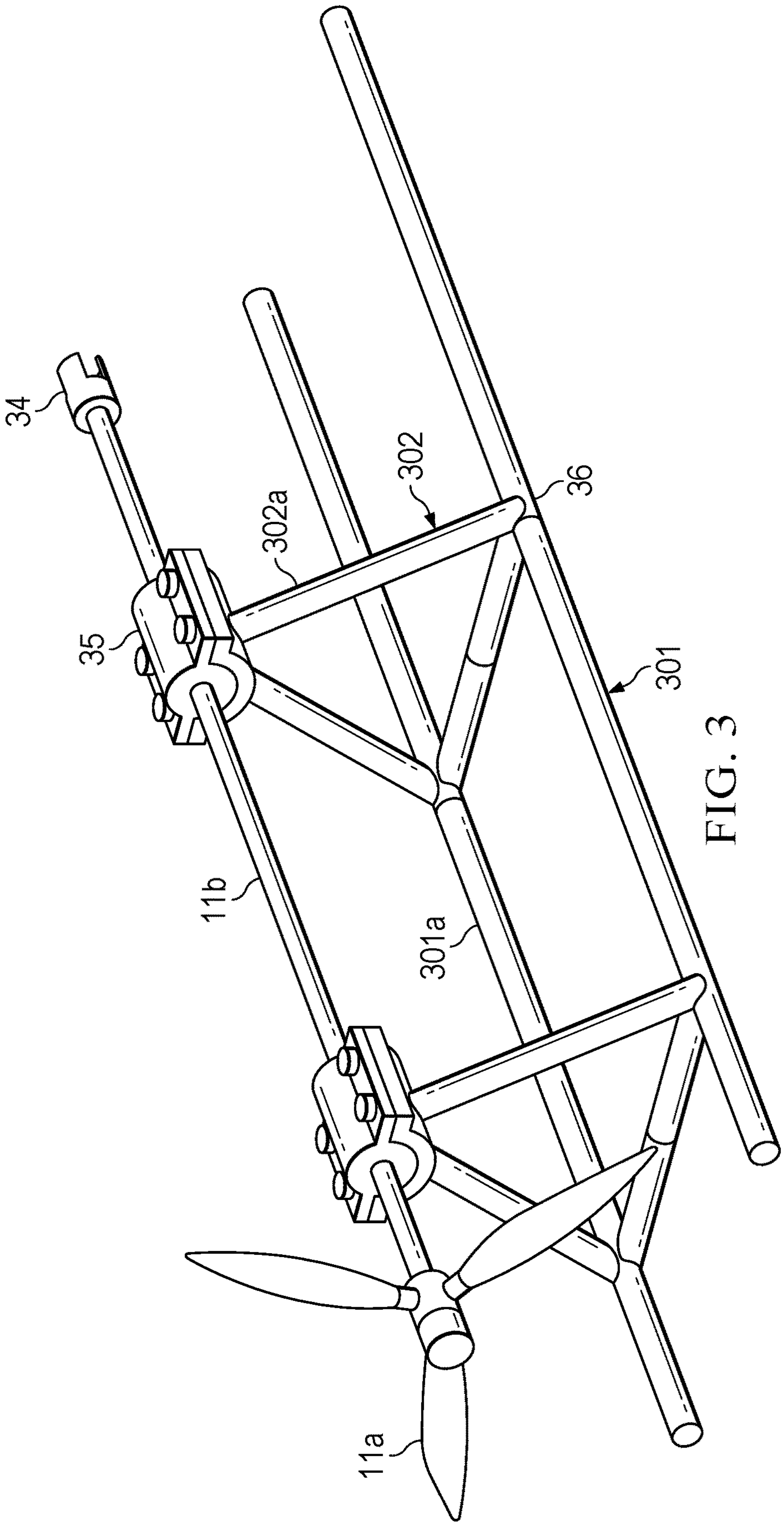
FIG. 3 illustrates a blade module attached to a support module.
Figure 4:
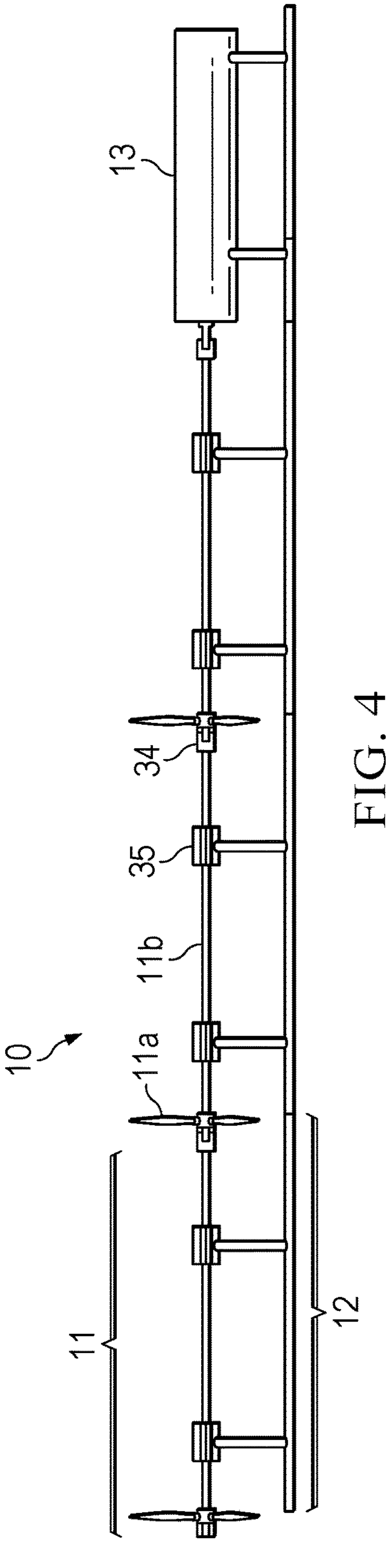
FIG. 4 is a side view of the turbine system of FIG. 2 (having three blade modules).

FIG. 3 illustrates a blade module 11 attached to a support module 12. FIG. 4 is a side view of the turbine system 10 of FIG. 2 (having three blade modules 11).

Each blade module 11 has a blade set 11*a*, a rotor shaft portion 11*b*, and a rotor shaft coupling 35. Rotor shaft couplings 35 attach rotor shaft portions 11*b* of the blade modules 11 together, resulting in a rigid rotor shaft 11*c* that runs the length of the system 10, from the first blade module 11 to the generator 13, and uses the energy from all blade sets 11*a* to drive the generator.

Each blade set 11*a* comprises a number of lift-type axial rotor blades. In the example of this description, each blade set 11*a* has three blades, but more or fewer could be used.

As discussed below in connection with FIG. 8, each blade set 11*a* has a diameter that will optimize torque from the water flow. Similarly, the blade angle and the distance between blade sets 11*a* is optimized so that each blade set 11*a* produces optimal energy.

A single generator 13 is aft of the last blade module 11. Generator 13 is generally cylindrical, thereby having a rounded face toward the water flow direction. This face has a small area relative to the water flow, resulting in minimal reactive force from the presence of the generator in the flow. In other embodiments, generator 13 may be fore of the first blade module 11.

In the example of this description, each support module 12 has rigid parallel rails 301*a* and rigid angled truss members 302*a*, securely attached to each other. The parallel rails 301*a* rest on the bottom of the stream bed, and the angled truss members 302*a* support the rotor shaft 11*c*. This results in a triangular or "A-shaped" support frame, but other configurations are possible. Common features of the support modules 12 are that each support module 12 has at least one horizontal bottom piece 301 that secures the system 10 on the bottom of the stream bed and at least one upright piece 302 to which the blade modules may be attached in a manner that allows the blades to properly rotate.

The ends of the various pieces of the support modules 12 have support module couplings 36, which allow easy connection of a number of support modules 12 in series. As stated above, the support modules 12 allow the entire support frame of turbine system 10 to be assembled and installed independently of the blade modules 11 if desired.

Figure 4A:
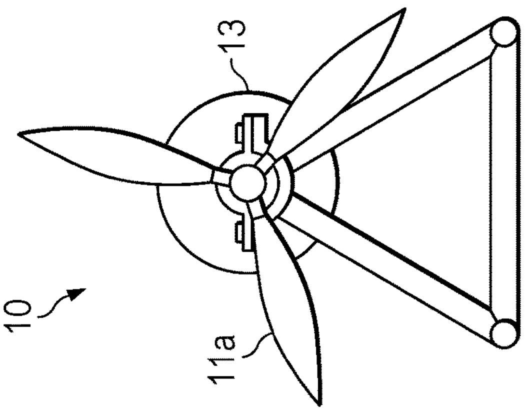
FIG. 4A is a front view of the turbine system.

FIG. 4A is a front view of the turbine system 10, modified to show generator 13 upstream of the first blade module 11. In either embodiment, the face of generator 13 has a small area normal to the water flow. This results in reduced reactive forces.

Figure 5:
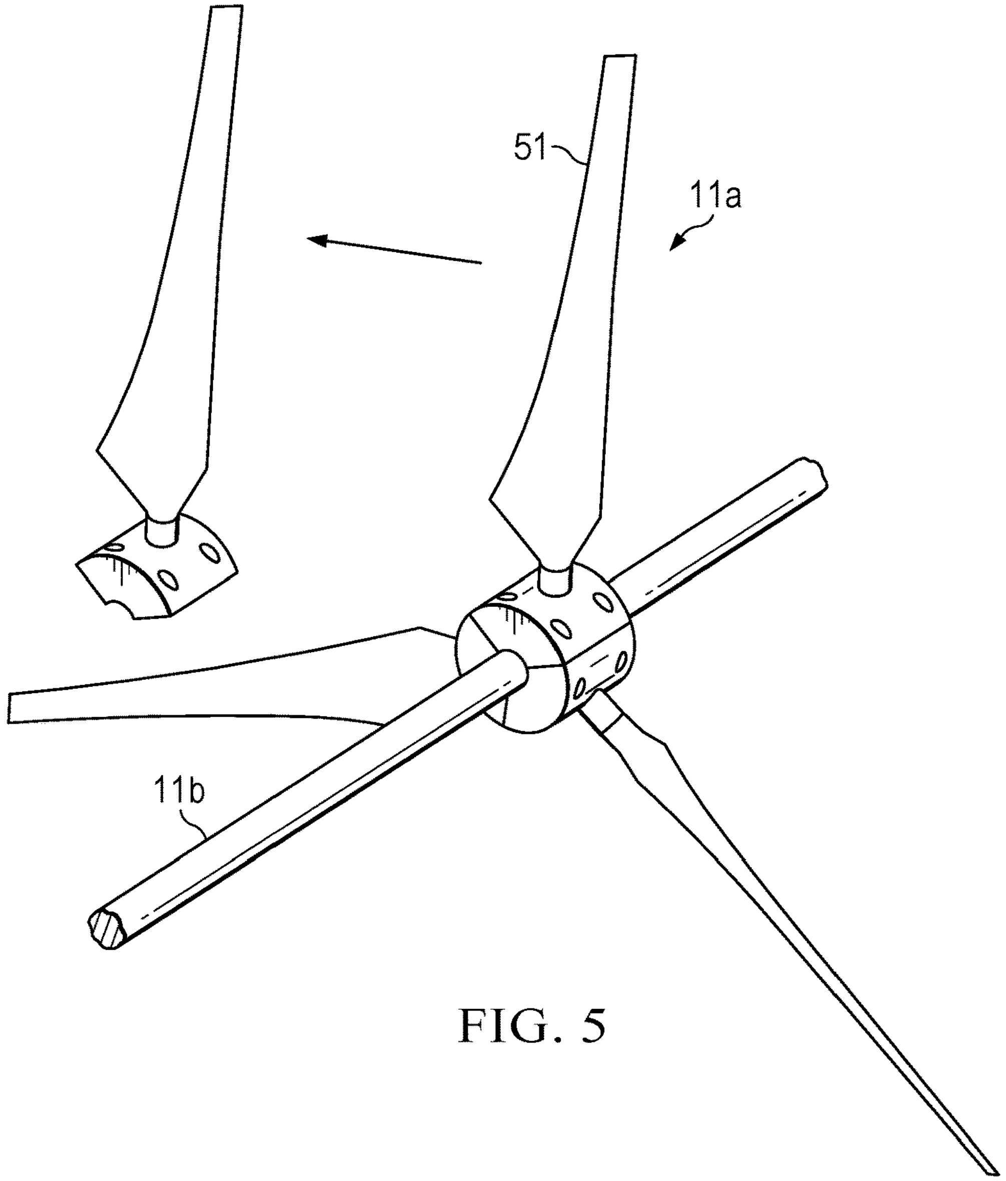
FIG. 5 illustrates a blade set and the attachment of each blade to the rotor shaft portion of the corresponding blade module.

FIG. 5 illustrates a blade set 11*a* and the attachment of each blade 51 to the rotor shaft portion 11*b* of the corresponding blade module 11. As indicated by the arrow, the blade coupling 34 of the blade set 11*a* to the rotor shaft 11*b* is segmented. This allows each individual blade 51 to be easily attached and to be easily removed and replaced.

Figure 6:
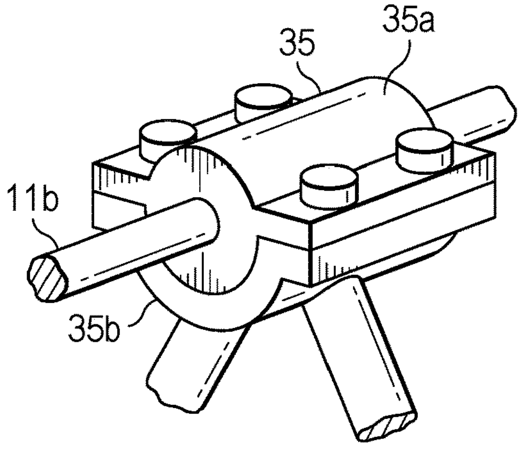
FIG. 6 illustrates a single rotor shaft support bearing.

FIG. 6 illustrates a single rotor shaft coupling 35. Each coupling 35 has a top portion 35*a* and a bottom portion 35*b*. A rotor shaft portion lib runs through the top portion 35*a*. The top portion 35*a* has a bearing, such that the rotor shaft 11*c* may easily rotate within the bearing. An example of a suitable bearing is a journal bearing. The bearings may be oil bearings or may be working fluid (water) bearings due to lower radial loading.

Figure 7:
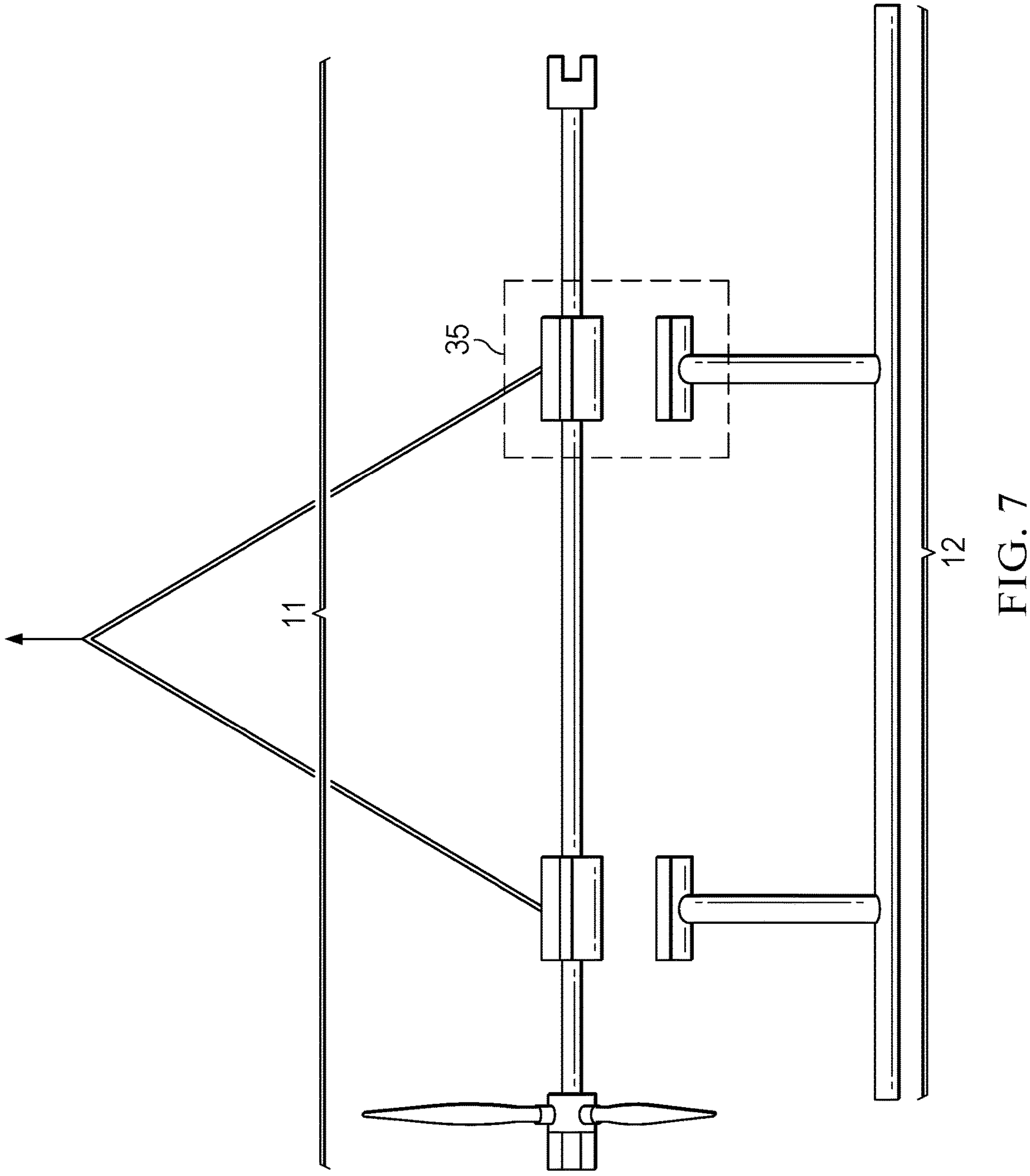
FIG. 7 illustrates how a rotor shaft support bearing allows a blade module to be separable from its support module.

FIG. 7 illustrates how a rotor shaft coupling 35 allows a blade module 11 to be separable from its support module 12. As indicated by the arrows, the support modules 12 may be installed on the stream bed independently of the blade modules 11 and generator 13. Any blade module 11 may be lowered (or raised) toward or away from the support modules 12. This allows repairs and changes to the system to be easily made.

Figure 8:
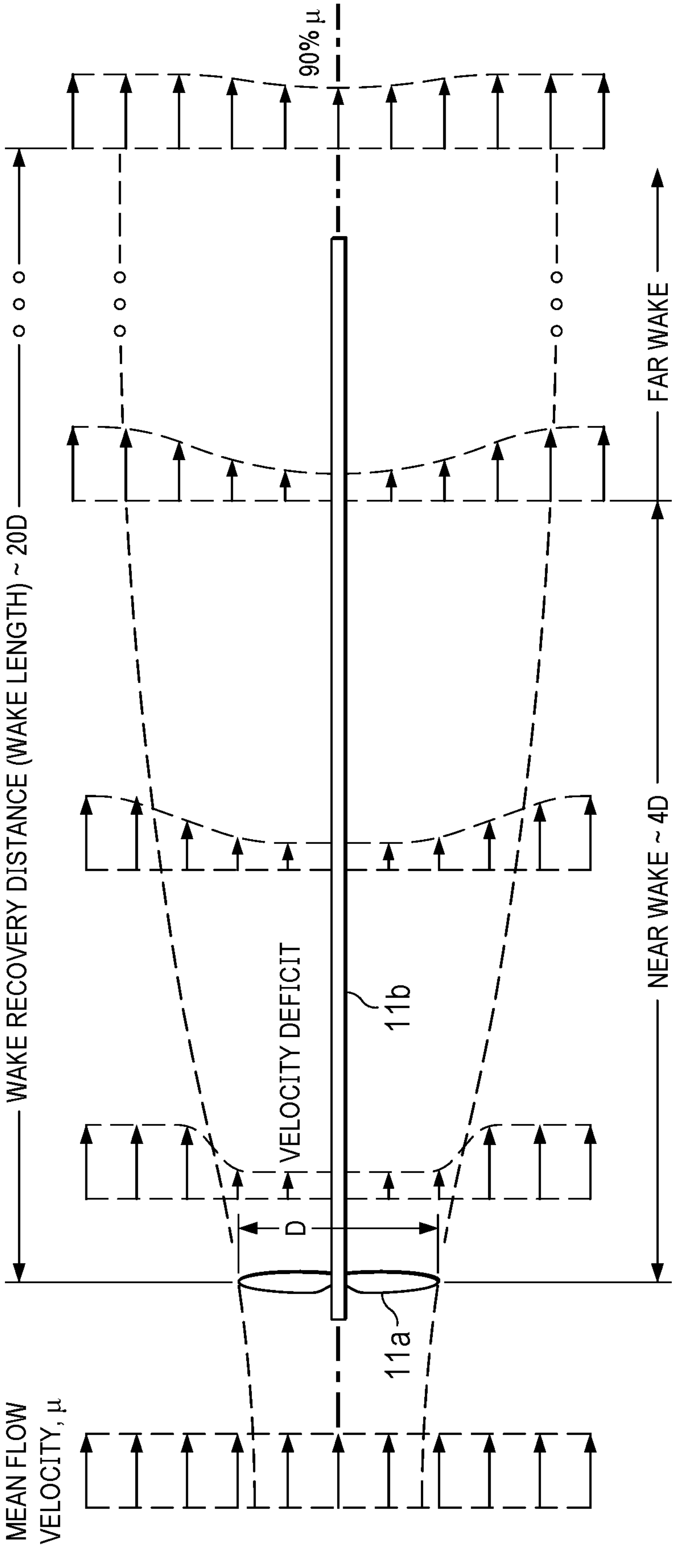
FIG. 8 illustrates wakes created due to fluid-blade interaction and energy conversion.

FIG. 8 illustrates wakes created due to fluid-blade interaction and energy conversion. Two blade sets 11*a* are illustrated, with each blade set 11*a* having a diameter D.

The water flow presented to the first blade set 11*a* has a mean flow velocity, u. This blade set 11*a* results in a wake and a mean flow velocity deficit.

FIG. 8 further illustrates how the distance between blade sets 11*a* may be optimized to minimize wake losses. The total wake recovery (wake length) is generally about 20D. A "near wake" is about 4D, with the remainder being considered "far wake". The second blade set 11*a* (relative to the face of the water flow is placed at an optimal distance to maximize torque of the assembled rotor.

The mean flow velocity deficit decreases with the wake distance. In the example of FIG. 8, the velocity has regained about 90% of its original value at the end of the wake recovery distance 20D.

In the example of FIG. 8, the second blade set 11*a* is placed at some point after the near wake of 4D and before the end of the far wake 20D. At this point the mean flow velocity has regained about 75% of its original value. It is expected that for most applications, blade set placement of about 3D to 15D apart will be optimal.

Various features may be added to subdue loading on the turbine blades. Specifically, the incidence angle of the blades can be made to passively vary depending on current velocity. This will help prevent blade failure when the current velocity is high.

Figure 9:
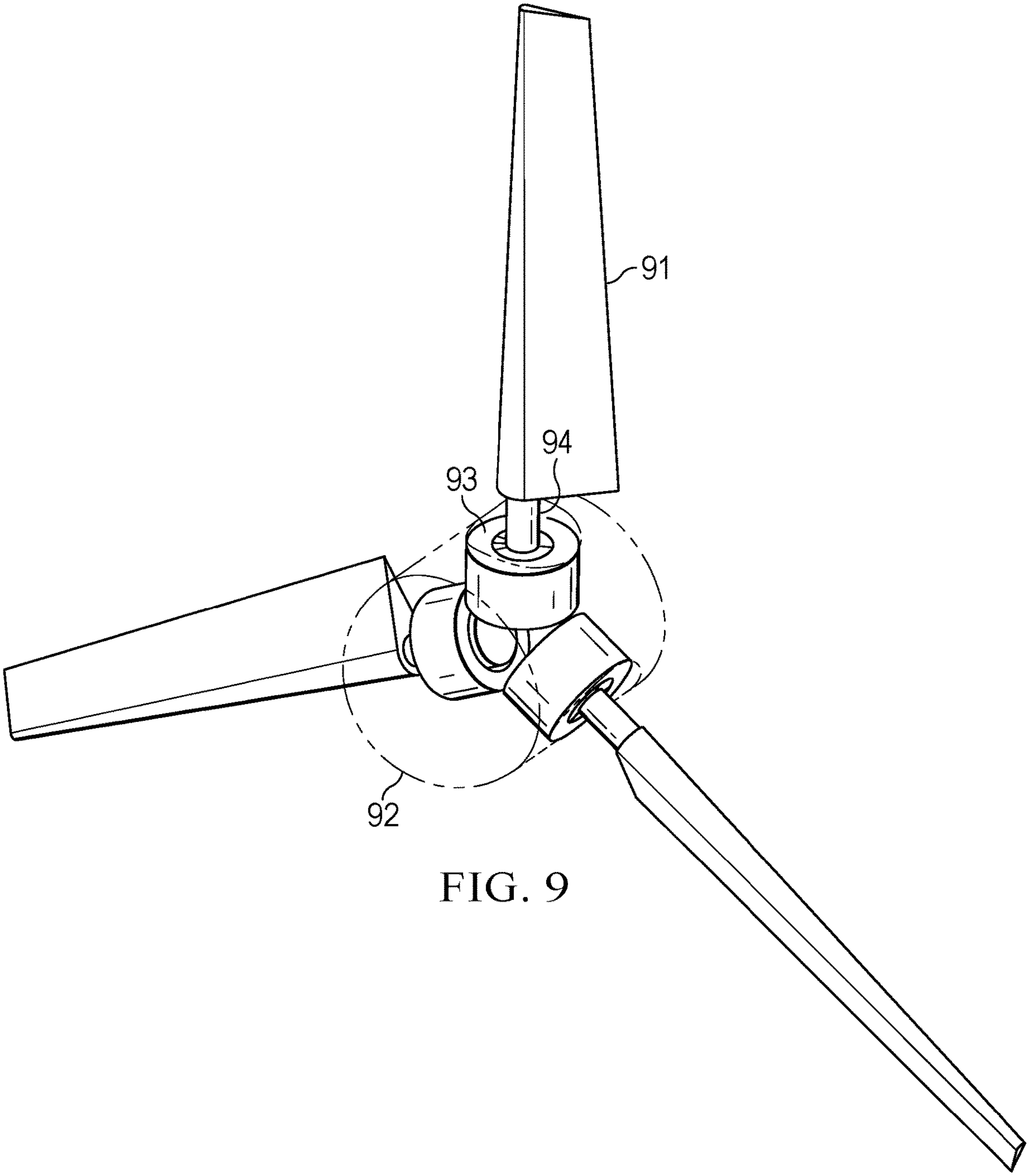
FIGS. 9 and 10 illustrate an alternative attachment of blades to the turbine rotor.
Figure 10:
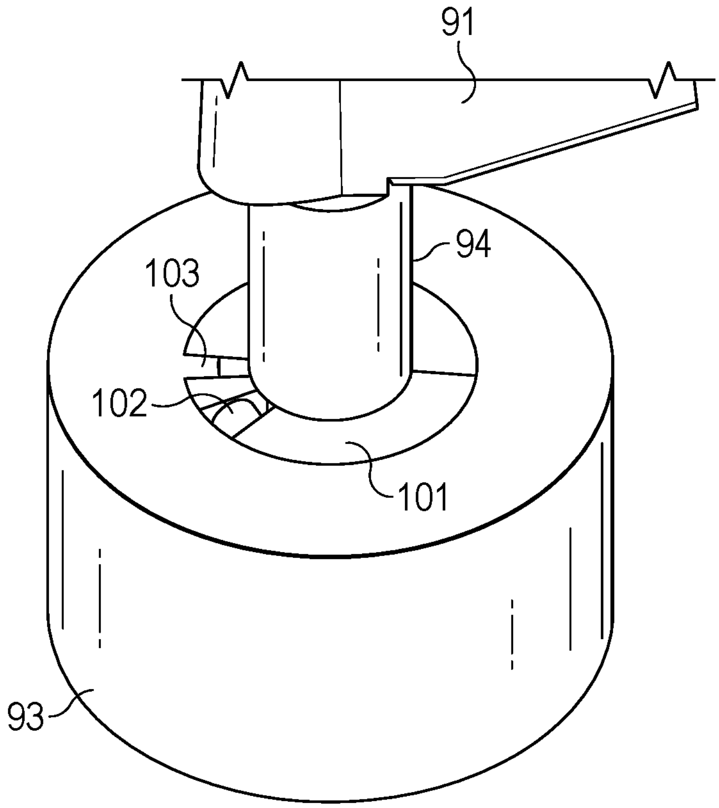

FIGS. 9 and 10 illustrate an alternative attachment of blades 91 to the turbine rotor 92. Each blade is attached by means of a radial bushing 93 that receives a blade rotor 94. Bushing 93 enables blade rotation relative to the turbine shaft rotor, while providing necessary support for the blade.

Each bushing 93 holds the blade 91 in place with a rotor seat 101. A spring 102 is placed between the rotor seat 101 and a stopper 103. The spring 102 is preloaded using the hydrokinetic load as calculated from maximum current velocity. A net load exceeding the spring force represents a safety margin. If desired, for low current energy conversion, springs may be used on both sides of the rotor seat.

Thrust mitigation may be provided with a thrust bearing in the generator 13 or with thrust mitigation at the support modules 12.

Figure 11:
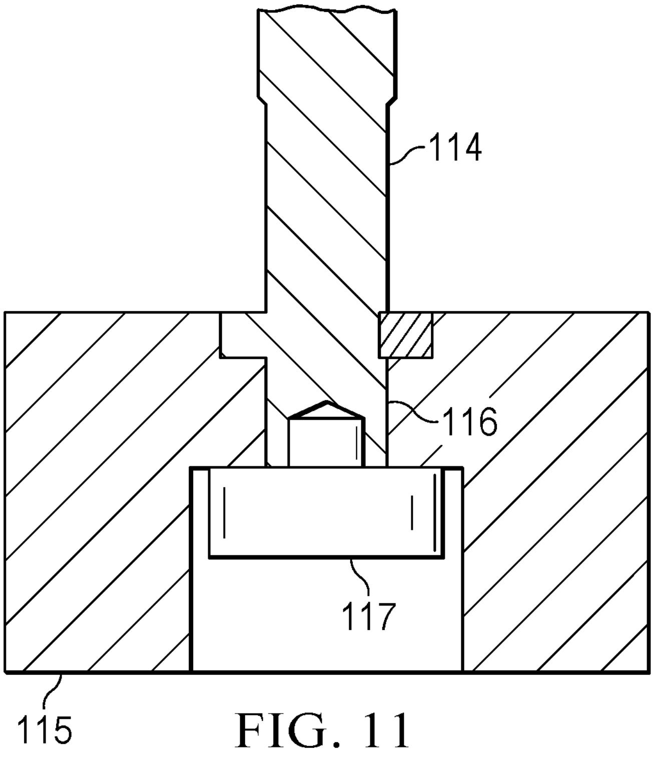
FIG. 11 illustrates an alternative embodiment to the blade rotor bushing.

FIG. 11 illustrates an alternative embodiment to the blade rotor bushing. A blade support 115 has both a radial bushing 116 and a preloaded thrust bearing 117. Examples of suitable thrust bearings 117 are roller and ball thrust bearings.

What is claimed is:

1. A modular hydrokinetic turbine system for generating energy in a water stream having a stream bed and a water stream direction, comprising:

- a number of blade modules, each blade module of the number of blade modules having a blade set with a number of turbine blades, a rotor shaft portion, and a rotor shaft coupling;
- wherein one or more of the rotor shaft couplings allows two or more of the blade modules to be connected in series such that one or more of the rotor shaft portions provide a rotor shaft extending in the water stream direction;
- a number of support modules, each support module of the number of support modules having at least one horizontal bottom piece operable to rest on the stream bed and at least one upright piece operable to support a respective one of the blade modules;
- wherein all of the support modules are coupled one to another in series, such that the number of support modules are a self-supporting support assembly that supports all of the blade modules;

wherein each rotor shaft coupling is configured to allow an associated pair of the rotor shaft portions to be raised from or lowered onto the support assembly when the modular hydrokinetic turbine system is in situ in the water stream;

wherein each of the rotor shaft portions is rotatable within a respective one of the rotor shaft couplings; and a generator located at one end of the system operable to be driven by the rotor shaft.

2. The system of claim 1, wherein all of the turbine blades are lift blades.

3. The system of claim 1, wherein the generator is downstream of all of the blade modules.

4. The system of claim 1, wherein the generator is upstream of all of the blade modules.

5. The system of claim 1, wherein each blade set has a diameter, D, and wherein a placement of each blade set along the rotor shaft is in a range of 3D to 15D apart.

6. The system of claim 1, wherein each turbine blade is attached to an associated rotor shaft portion by a respective bushing that enables blade rotation relative to the associated rotor shaft portion.

7. The system of claim 6, wherein the bushing is spring-loaded.

8. The system of claim 6, wherein the bushing has a thrust bearing.

9. A method of assembling a hydrokinetic turbine system for providing electrical power using water flow, and for installation in a water stream having a stream bed and a water stream direction, comprising:

connecting a number of blade modules and a number of support modules of the hydrokinetic turbine system in series;

wherein each blade module of the number of blade modules has a blade set with a number of turbine blades, a rotor shaft portion, and a rotor shaft coupling;

wherein one or more of the rotor shaft couplings allows two or more of the blade modules to be connected in series such that one or more of the rotor shaft portions provide a rotor shaft extending in the water stream direction;

wherein each of the number of support modules has at least one horizontal bottom piece operable to rest on the stream bed and at least one upright piece operable to support a respective one of the blade modules;

wherein all of the support modules are operable to be coupled one to another in series, such that the number of support modules are a self-supporting support assembly that supports all of the blade modules;

wherein each rotor shaft coupling is configured to allow an associated pair of the rotor shaft portions to be raised from or lowered onto the support assembly when the hydrokinetic turbine system is in situ in the water stream;

wherein each of the rotor shaft portions is rotatable within a respective one of the rotor shaft couplings; and connecting a generator to one end of the system operable to be driven by the rotor shaft.

10. The method of claim 9, wherein the number of support modules are connected to each other and placed on the stream bed prior to connecting the number of blade modules to the number of support modules.

11. The method of claim 9, wherein each of the number of blade modules is connected to a respective one of the number of support modules prior to being placed on the stream bed.

12. The method of claim 9, wherein there is a one-to-one ratio of the number of blade modules to the number of support modules.

13. The method of claim 9, wherein all of the turbine blades are lift blades.

* * * * *